(12) United States Patent
Zhai et al.

(10) Patent No.: US 12,197,353 B2
(45) Date of Patent: Jan. 14, 2025

(54) NETWORK DEVICE CONFIGURATION BASED ON SLAVE DEVICE TYPE

(71) Applicant: Renesas Electronics America Inc., Milpitas, CA (US)

(72) Inventors: Shubing Zhai, San Jose, CA (US); James Wang, Shanghai (CN); Jankin Hu, Shanghai (CN); Wei Wang, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 6 days.

(21) Appl. No.: 18/331,432

(22) Filed: Jun. 8, 2023

(65) Prior Publication Data

US 2023/0315653 A1 Oct. 5, 2023

Related U.S. Application Data

(63) Continuation of application No. 17/739,749, filed on May 9, 2022, now Pat. No. 11,709,787, which is a continuation of application No. 17/229,165, filed on Apr. 13, 2021, now Pat. No. 11,366,776.

(51) Int. Cl.
*G06F 3/00* (2006.01)
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0016* (2013.01)

(58) Field of Classification Search
None
See application file for complete search history.

(56) References Cited

U.S. PATENT DOCUMENTS

| | | | |
|---|---|---|---|
| 11,366,776 B1* | 6/2022 | Zhai | G06F 13/4282 |
| 2002/0103945 A1* | 8/2002 | Owen | H04L 9/40 |
| | | | 710/10 |
| 2008/0172510 A1* | 7/2008 | Chen | G06F 13/36 |
| | | | 710/242 |
| 2013/0166801 A1* | 6/2013 | Chun | G06F 13/4059 |
| | | | 710/110 |

* cited by examiner

*Primary Examiner* — Henry Tsai
*Assistant Examiner* — Dean Phan
(74) *Attorney, Agent, or Firm* — SCULLY, SCOTT, MURPHY & PRESSER, P.C.

(57) ABSTRACT

Systems and methods for controlling data transaction between master and slave devices are described. A master device can be connected to multiple slave devices that can operate under one of a first, a second, and a third operation modes. The first operation mode can cause the master device to perform data transactions with the multiple slave devices via a network element and the multiple slave devices can be connected to one another via the network element. The second operation mode can disconnect the master device from the multiple slave devices, and multiple agents connected to the multiple slave devices can fulfill the data transactions. The third operation mode can cause the master device to perform data transactions with a first subset of the multiple slave devices via the network element, and can cause the master device to be disconnected from a second subset of the multiple slave devices.

20 Claims, 10 Drawing Sheets

NETWORK DEVICE CONFIGURATION BASED ON SLAVE DEVICE TYPE

CROSS-REFERENCE TO RELATED APPLICATIONS

This application is a continuation of U.S. patent application Ser. No. 17/739,749, filed on May 9, 2022, which is a continuation of U.S. patent application Ser. No. 17/229,165, filed on Apr. 13, 2021 and issued as U.S. Pat. No. 11,366,776 B1 on Jun. 21, 2022. The entire disclosure of each of U.S. patent application Ser. No. 17/739,749 and U.S. patent application Ser. No. 17/229,165 is incorporated by reference herein.

BACKGROUND

The present disclosure relates in general to apparatus, devices, systems, and methods that can configured a network device to perform data transactions using different operating modes based on different types of the data transactions.

A master device can communicate with one or more slave devices via network devices, such as hubs and switches, to perform data transactions such as read and write data to one another. A performance of the data transaction can be based on communication protocols supported by the master device and the slave devices. Different slave devices can support different communication protocols and different types of data transactions.

SUMMARY

In some examples, an apparatus for controlling data transactions between a master device and a plurality of slave devices is generally described. The apparatus can include a master port connected to a master device. The apparatus can further include a plurality of slave ports connected to a plurality of slave devices. The apparatus can further include a network element connected to the master port. The apparatus can further include a controller connected to the master port and the plurality of slave ports. The controller can be configured to control the plurality of slave ports to operate under a specific operation mode among a first operation mode, a second operation mode, and a third operation mode. The first operation mode can cause the master device to perform a data transaction with the plurality of slave devices via the network element, and the plurality of slave devices can be connected to one another via the network element. The second operation mode can disconnect the master port from the plurality of slave ports, and can cause a plurality of circuit blocks connected to the plurality of slave ports to fulfill the data transaction with the plurality of slave devices. The third operation mode can cause the master device to perform the data transaction with a first subset of the plurality of slave devices via the network element, and can cause the master device to be disconnected from a second subset of the plurality of slave devices.

In some examples, a system including a master device and a plurality of slave devices is generally described. A network device can be connected to the master device and the plurality of slave devices. The network device can include a master port connected to the master device. The network device can further include a plurality of slave ports connected to the plurality of slave devices. The network device can further include a network element connected to the master port. The network device can further include a controller connected to the master port and the plurality of slave ports. The controller can be configured to control the plurality of slave ports to operate under a specific operation mode among a first operation mode, a second operation mode, and a third operation mode. The first operation mode can cause the master device to perform a data transaction with the plurality of slave devices via the network element, and the plurality of slave devices can be connected to one another via the network element. The second operation mode can disconnect the master port from the plurality of slave ports, and can cause a plurality of circuit blocks connected to the plurality of slave ports to fulfill the data transaction with the plurality of slave devices. The third operation mode can cause the master device to perform the data transaction with a first subset of the plurality of slave devices via the network element, and can cause the master device to be disconnected from a second subset of the plurality of slave devices.

In some examples, a method for controlling data transaction between a master device and a plurality of slave devices is generally described. The method can include detecting a data transaction between a master device and a plurality of slave devices. The method can further include determining a type of the data transaction. The method can further include, based on the determined type of the data transaction, controlling a plurality of slave ports connected to the slave devices to perform the data transaction under a specific operation mode among a first operation mode, a second operation mode, and a third operation mode. The first operation mode can cause the master device to perform the data transaction with the plurality of slave devices via a network element, and the plurality of slave devices are connected to one another via the network element. The second operation mode can disconnect the master device from the plurality of slave ports, and can cause a plurality of circuit blocks connected to the plurality of slave ports to perform the data transaction with the plurality of slave devices. The third operation mode can cause the master device to perform the data transaction with a first subset of the plurality of slave devices via the network element, and can cause the master device to be disconnected from a second subset of the plurality of slave devices.

Further features as well as the structure and operation of various embodiments are described in detail below with reference to the accompanying drawings. In the drawings, like reference numbers indicate identical or functionally similar elements.

DETAILED DESCRIPTION

Figure 1:
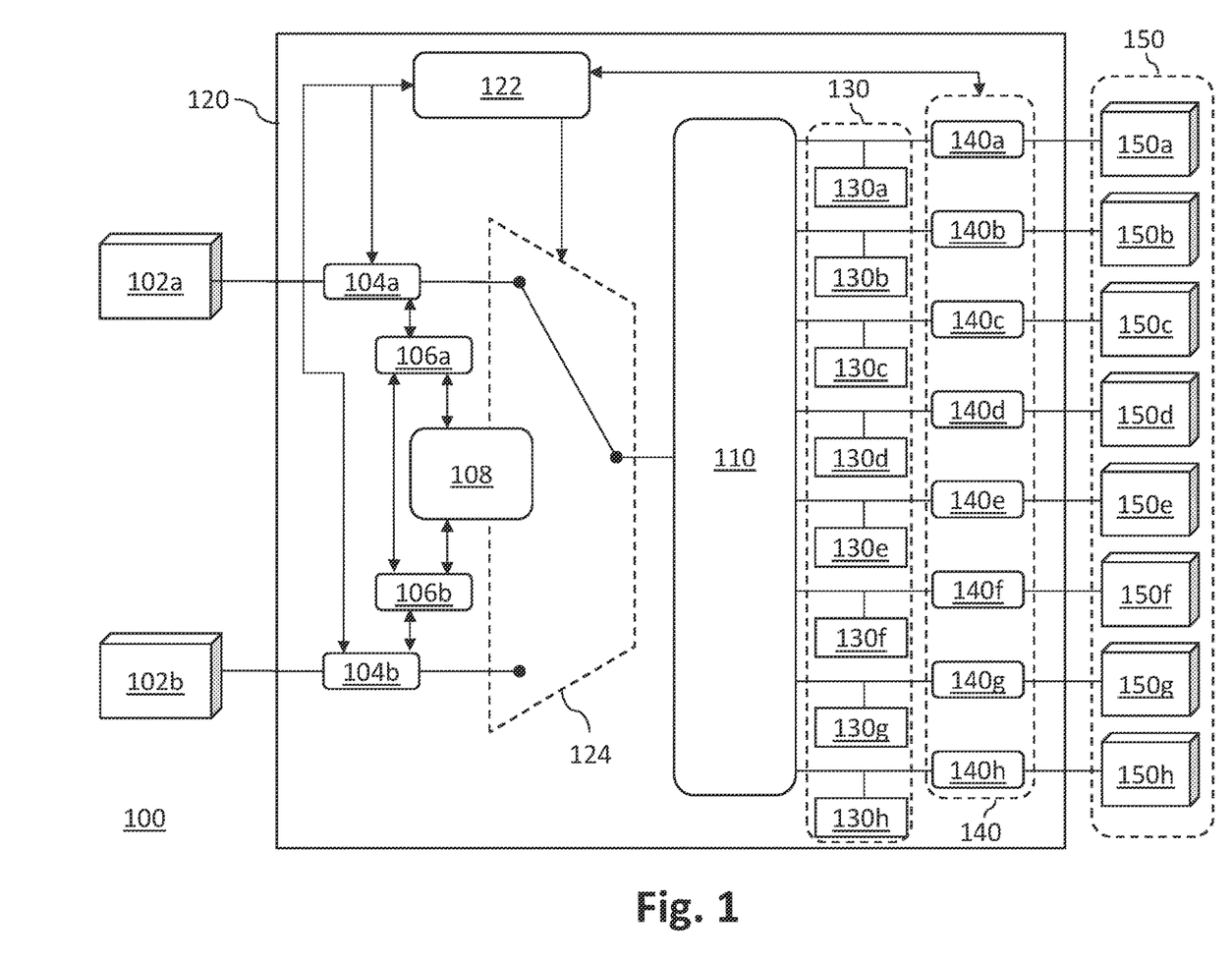
FIG. 1 is a diagram showing an example system that can implement network device configuration based on slave device type in one embodiment.

FIG. 1 is a diagram showing an example system 100 that can implement network device configuration based on slave device type in one embodiment. The system 100 can be implemented on, for example, a circuit board such as a motherboard of a computer device. The system 100 can include one or more master devices, such as a master device 102a and a master device 102b. The master device 102a and the master device 102b can be a same type of device, or different types of devices, depending on an implementation of the system 100. For example, each one of the master device 102a and master device 102b can be a master device on a circuit board such as a controller on a motherboard. The system 100 can further include a plurality of slave devices 150, including 150a, 150b, 150c, 150d, 150e, 150f, 150g, 150h. Although eight slave devices are shown in FIG. 1, it will be apparent to a person of ordinary skill in the art that an arbitrary number of slave devices can be included in the system 100. The number of slave devices in the system 100 can depend on a desired implementation of the system 100. Some examples of the slave devices described herein can include, but not limited to, temperature sensors, fan sensors, voltage sensors, lid switches, clock generators, peripheral component interconnect (PCI) add-in cards of a computer system or device. It will be apparent to a person of ordinary skill in the art that the various connections between components shown in FIG. 1 can include one or more traces or lines. For example, a connection under an inter-integrated circuit (I2C) serial communication protocol, or an I3C serial communication protocol, can include a pair of lines including a serial clock line (SCL) and a serial data (SDA) line. In an example embodiment, the device 120 can be an edge hub device on an add-in card that connects to a motherboard. The master device 102a can be an on-card master of the add-in card and the master device 102b can be a motherboard master. Thus, the on-card master and the motherboard master can share access to the slave devices 150.

The system 100 can further include an apparatus or a device 120. The device 120 can include a master port 104a, a master port 104b, a network element 110, a controller 122, and a plurality of slave ports 140. The master ports 104a and 104b can be connected to the master devices 102a and 102b, respectfully. In an example embodiment, the master ports 104a and 104b can be identical circuit blocks including the same set of circuit components. The master side ports 104a and 104b can be master side ports that can support master devices operating under Inter-Integrated Circuit (I²C) serial communication protocol and/or I3C (or Sense Wire) serial communication protocol. The plurality of slave ports 140 can include slave ports 140a, 140b, 140c, 140d, 140e, 140f, 140g, and 140h. The slave ports 140 can be connected to the slave devices 150 as shown in FIG. 1. In an example embodiment, the slave ports 140 can be identical circuit blocks including the same set of circuit components. The plurality of slave ports can be slave side ports that can support slave devices operating under I²C and/or I3C serial communication protocol.

The device 120 can further include a plurality of circuit blocks 130 (or "SMBus agents"), including 130a, 130b, 130c, 130d, 130e, 130f, 130g, and 130h. The circuit blocks 130 can be connected to the slave ports 140. In an example embodiment, the circuit blocks 130 can be identical circuit blocks including the same set of circuit components. Each one of the circuit blocks 130 can be a system management bus (SMBus) agent configured to receive or transmit SMBus transactions and can support serial clock line (SCL) stretching within the SMBus segment behind a slave port connected to a corresponding SMBus agent. In an example, a SMBus can be a single-ended two-wire bus that can be used for communication between the master devices 102a and 102b with the plurality of slave devices in the system 100.

The network element 110 can be a hub device or a switch that can connect a plurality of devices (e.g., slave devices 150) to allow the plurality of devices to operate as a single network segment. In an example embodiment, the network device can be a 1-to-N (1: N) I²C/I3C (e.g., supporting both I²C and I3C protocol) hub network that allows physical segmentation of an I²C/I3C hierarchy, which can reduce the load that the selected master device will see at any moment. In an example, the network element 110 can maintain software level transparency to cause all slave devices connected to the plurality of slave ports 140 to be accessed the same way as if all slave ports are directly connected, and as if the network element 110 is absent between the selected master device and the slave devices.

The master port 104a can be connected to an on-chip slave interface 106a, and the master port 104b can be connected to an on-chip slave interface 106b. The on-chip slave interfaces 106a and 106b can be connected to one another, and can be connected to storage element 108, where the storage element 108 can include a set of registers and buffers. In an example embodiment, the on-chip slave interfaces 106a and 106b can be identical circuit blocks including the same set of circuit components. In an example, the storage element 108 can include a shared register space that can be mapped to dedicated register space of each one of the on-chip slave interfaces 106a and 106b (or dedicated for the master ports 104a and 104b). Each one of the master ports 104a and 104b can have its own dedicated register being mapped to the register space in the storage element 108. The storage element 108 can further include a paged buffer space that can be mapped to the registers.

The controller 122 can be an intelligent logic unit configured to implement control logic to control the components of the device 120. The controller 122 can be configured to operate a switching element 124 to select one master port among the master ports 104a and 104b. In an example, the switching element 124 can be a multiplexer and the controller 122 can be configured to generate a select signal and use the select signal to operate the multiplexer to select a master port. The master device connected to the selected master port can connect to the network element 110, allowing the master device to have access to the plurality of slave ports 140. Further, the switching element 124 can allow the master devices 102a and 102b to share the downstream of a network implementing the system 100.

In an example, the multiplexer or switching element 124 can be in one of two states: 1) none of the master ports 104a and 104b is selected (e.g., no master devices connected to the slave ports 140); and 2) one of the two master ports 104a and 104b is selected and connected to the slave ports 140. When the switching element is in state 1), the master devices 102a and 102b cannot connect to the network element 110, and hence cannot see any slave devices connected to the slave ports 140. Further, under the state 1), the master devices 102a and 102b may see its own on-chip slave interfaces 106a and 106b. Thus, in some instances (e.g., under I2C operation) where a conflict can be present between a default slave address and the slave devices 150, the on-chip interface address can be re-programmed without conflict with the downstream device prior to enabling the slave ports 140.

The controller 122 can be configured to control the master ports 104a and 104b, and the plurality of slave ports 140 individually. By controlling the master ports 104a and 104b, and the plurality of slave ports 140 individually, the system 100 can be configured to perform transactions for different slave device types and different communication protocols. Descriptions of various operating modes of the master ports 104a and 104b, and the plurality of slave ports 140, will be described in more detail below.

Figure 2:
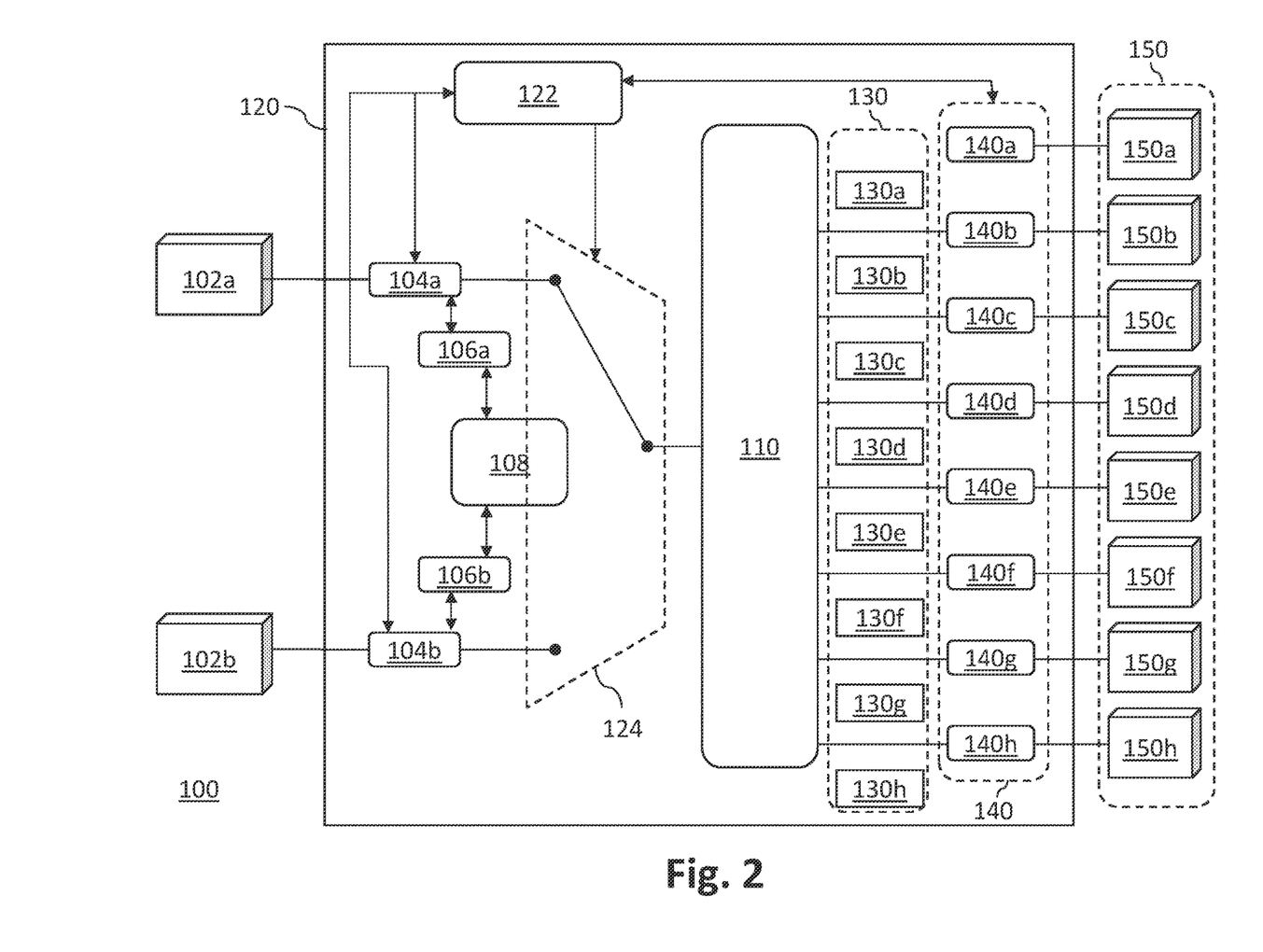
FIG. 2 is a diagram showing an example operation mode of the system shown in FIG. 1 in one embodiment.

FIG. 2 is a diagram showing an example operation mode of the system 100 shown in FIG. 1 in one embodiment. In the example shown in FIG. 2, the controller 122 can control the plurality of slave ports 140 to operate in a first slave operation mode (referred to as transparent mode). To configure the plurality of slave ports 140 to operate under the transparent mode, the selected master device 102a can connect the plurality of slave ports 140 to the network element 110. The selected master device 102a can also disconnect the plurality of slave ports 140 from their respective agents or circuit blocks 130. The connection of the plurality of slave ports 140 to the network element 110, and the disconnection of the plurality of slave ports 140 from the agents, can allow the selected master device 102a to access the plurality of slave devices 150 via the network element 110.

In an example, the plurality of slave ports 140 can be configured to operate in the transparent mode in response to the plurality of slave devices 150 being I3C slave devices or I3C compatible I2C slave devices, or in response to a data transaction being an I3C transaction. For example, the controller 122 can analyze a data frame structure (e.g., to identify a transaction start, transaction stop, etc.) of the data transaction to determine whether the data transaction is an I2C or an I3C transaction. The circuit blocks 130 can be deactivated in the transparent mode, and thus, no SCL stretching may be performed in the transparent mode. By having the plurality of slave devices 150 connected to the network element 110, the plurality of slave devices 150 can see the same speed and traffic. In order to maintain the speed and traffic, the controller 122 can be configured to alter the operating speed at the slave ports 140 in response to certain conditions. For example, under the transparent mode, in response to at least one of the plurality of slave devices 150 operating at a lower speed than the rest of the slave devices, the controller 122 can be configured to reduce an operating speed of the plurality of slave ports 140 to cause the plurality of slave devices to operate at a same operating speed. In an example, the controller 122 can determine that the slave devices 150g and 150h are I2C slave devices and the slave devices 150a to 150f are I3C slave devices. In response to the determination, the controller 122 can reduce the operating speed of the slave ports 140a to 140f to be the same as the slave ports 140g and 140h, such that the plurality of slave devices 150 can operate as the same network segment under the same speed. In some examples, to determine whether at least one of the slave devices 150 are operating at lower speeds, the controller 122 can monitor the traffic within the system 100 to identify slave devices that can be operating at lower speed when compared to other slave devices.

Figure 3A:
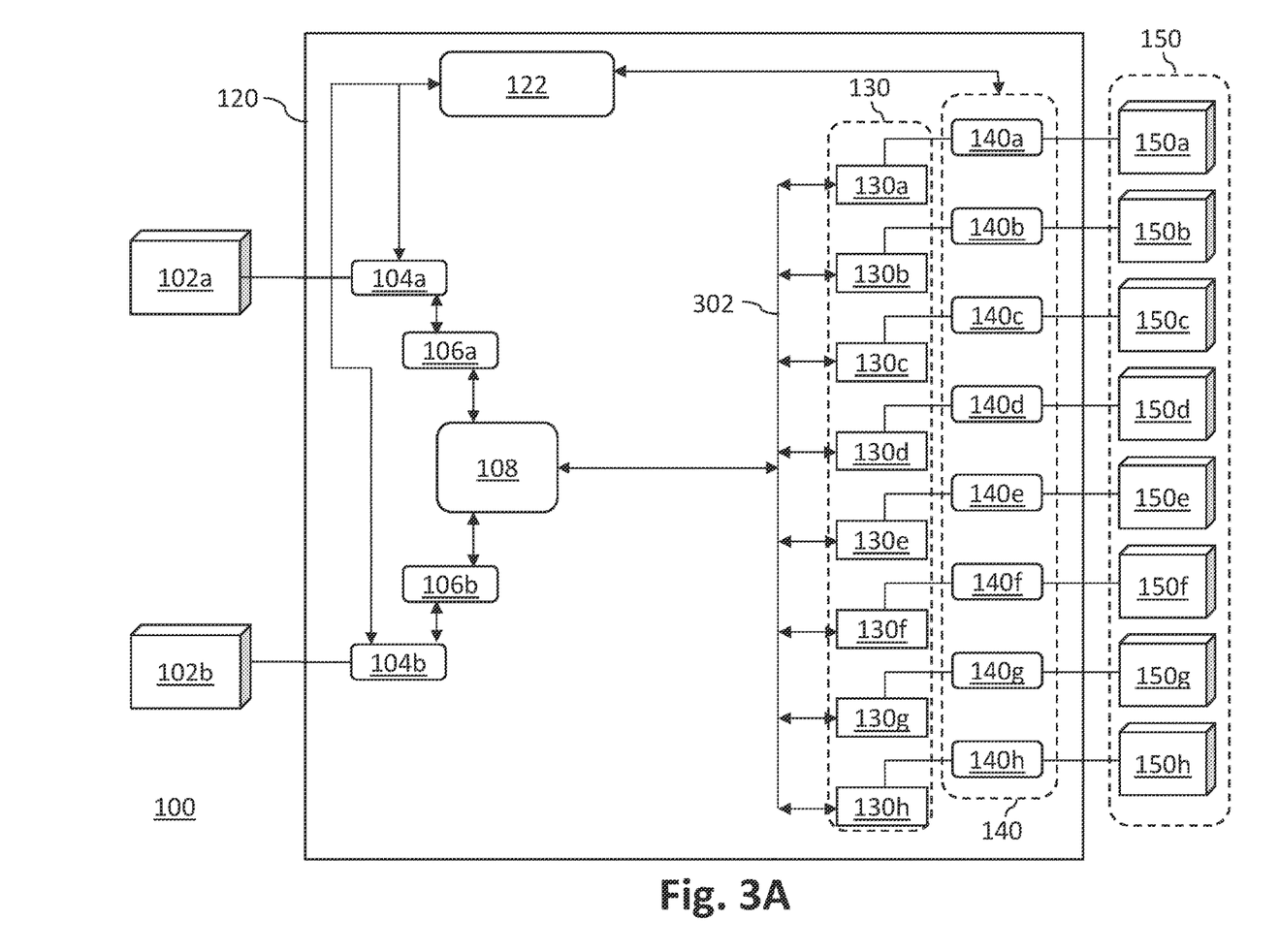
FIG. 3A is a diagram showing another example operation mode of the system shown in FIG. 1 in one embodiment.
Figure 3B:
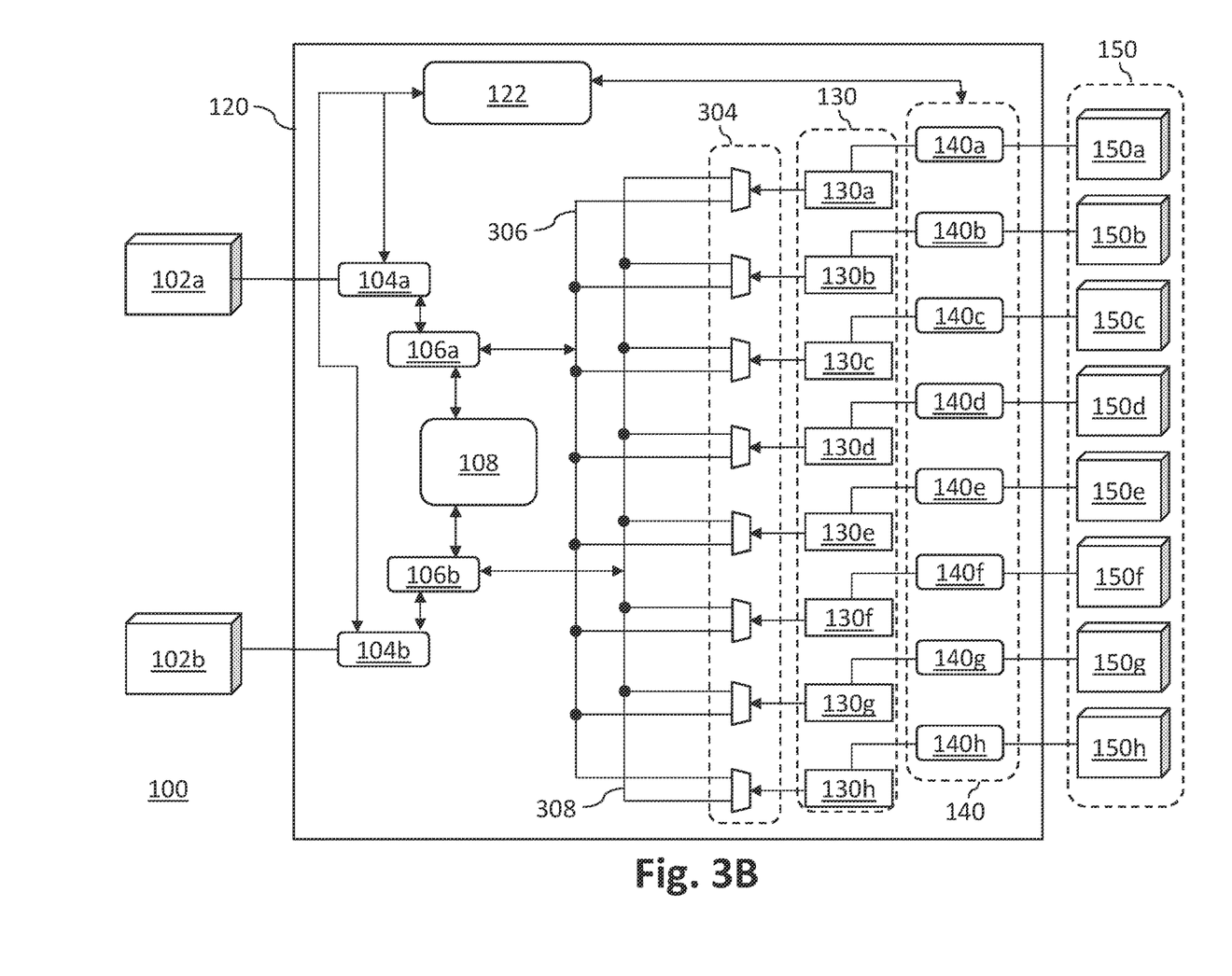
FIG. 3B is a diagram showing another example operation mode of the system shown in FIG. 1 in one embodiment.

FIG. 3A and FIG. 3B are diagrams showing another example operation mode of the system 100 shown in FIG. 1 in one embodiment. In the example shown in FIG. 3A, the controller 122 can control the plurality of slave ports 140 to operate in a second slave operation mode (referred to as agent mode or non-transparent mode). To configure the plurality of slave ports 140 to operate under the non-transparent mode, the controller 122 can disconnect the plurality of slave ports 140 from the network element 110 and from the master ports 104a and 104b. The controller 122 can also connect the plurality of slave ports 140 to their respective agents or circuit blocks among the circuit blocks 130. The disconnection of the plurality of slave ports 140 from the network element 110, and the connection of the plurality of slave ports 140 to the circuit blocks 130, can allow the circuit blocks 130 to handle communications with the slave devices 150 by accessing the registers in the storage element 108.

In an example, the plurality of slave ports 140 can be configured to operate in the non-transparent mode in response to the plurality of slave devices 150 being I2C slave devices or system management bus (SMBus) slave devices or in response to a data transaction being an I2C transaction. Under the non-transparent mode, the plurality of slave ports 140 can be disconnected from each other, and may not see the same speed and traffic. Further, under the non-transparent mode, each circuit block among the plurality of circuit blocks 130 can be configured to access transaction descriptors and transaction data stored in the registers and buffers in the storage element 108. Examples of transaction descriptors and data that can be received by the circuit blocks 130 under the non-transparent mode can include a target slave address, a value of a read or write bit, a transaction type (e.g., single transaction, write, read, write followed by read, etc.), transaction speed (when not stretched), number of bytes to be written or read, payload data for write transactions, received data for write followed by read transactions, etc. Since the circuit blocks 130 are connected to the slave devices 150 under the non-transparent mode, the circuit blocks 130 can act as a slave side master device to handle communications with the slave devices 150 using the received transaction descriptors and data. In an example, the circuit blocks 130 can access registers and buffers in the storage element 108 via an in-band interrupt (IBI) trace 302.

In another example embodiment shown in FIG. 3B, each circuit block among the circuit blocks 130 can be connected to an individual multiplexer among a plurality of multiplexers 304. Each multiplexer among the multiplexers 304 can be connected to a trace 306 and a trace 308, where the trace 306 can connect the multiplexers 304 to the master port 104a and the trace 308 can connect the multiplexers 304 to the master port 104b. In some examples, the traces 306 and 308 can each be an internal communication bus that allows the on-chip slave interfaces 106a and 106b to access the circuit blocks 130. In response to the master port 104a being the selected master port, the multiplexers 304 can select the trace 306 to connect the on-chip slave interface 106a with the circuit blocks 130 under the non-transparent mode. The connection between the on-chip slave interface 106a and the circuit blocks 130 can allow the circuit blocks 130 to access the storage element 108 via the on-chip slave interface 106a.

Figure 4:
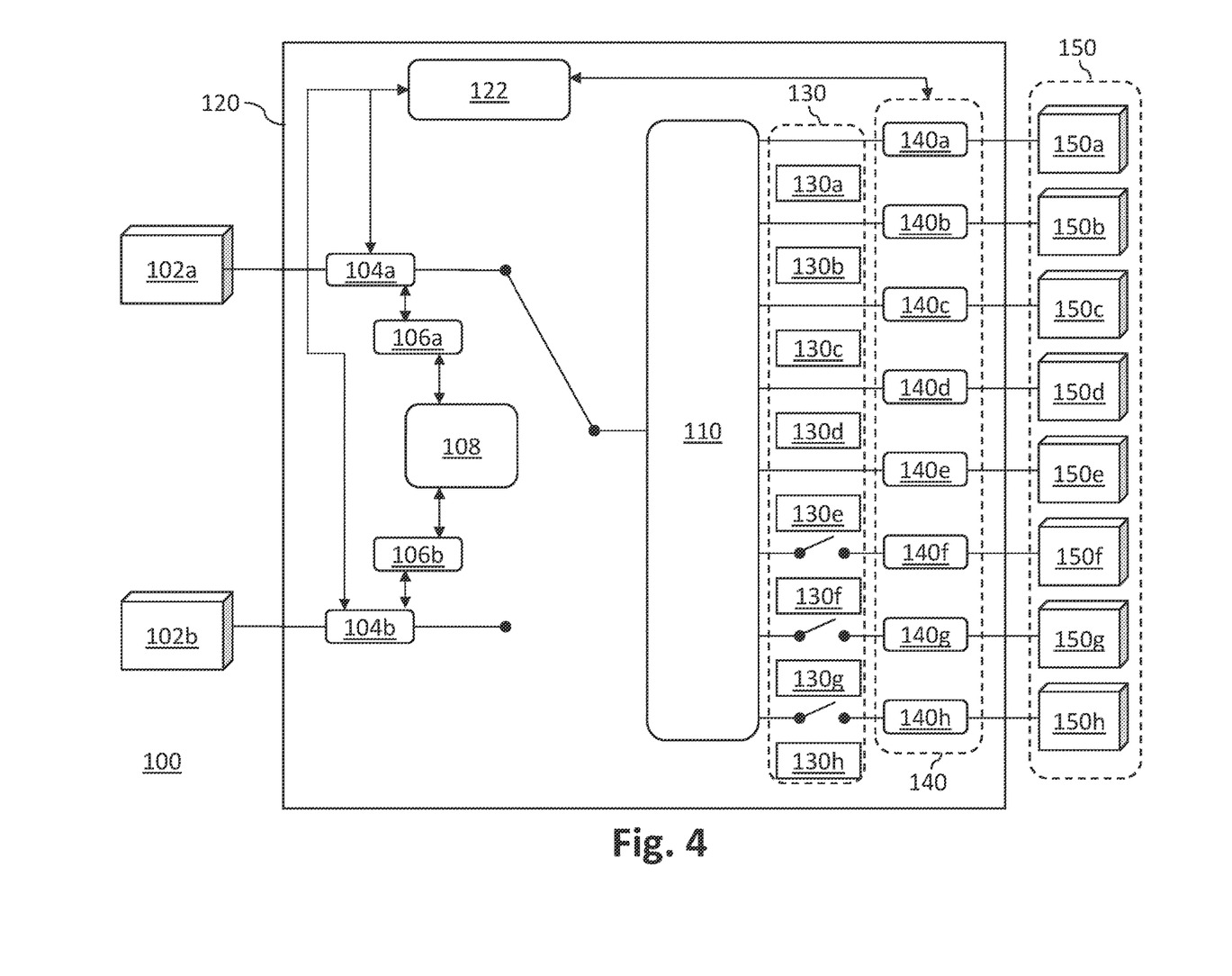
FIG. 4 is a diagram showing another example operation mode of the system shown in FIG. 1 in one embodiment.

FIG. 4 is a diagram showing another example operation mode of the system 100 shown in FIG. 1 in one embodiment. In the example shown in FIG. 4, the controller 122 can control the plurality of slave ports 140 to operate in a third slave operation mode (referred to as partitioned mode). To configure the plurality of slave ports 140 to operate under the partitioned mode, the controller 122 can selectively connect a subset of the plurality of slave ports 140 to the network element 110, and selectively disconnect another subset of the plurality of slave ports 140 from the network element 110. The selective connection and disconnection of the plurality of slave ports 140 to and from the network element 110 can allow the selected master device 102a to access the connected slave devices via the network element 110. Under the partitioned mode, the slave ports that remain connected to the network element 110 can operate under the transparent mode.

The partitioned mode can be activated for I3C slave devices or I3C compatible I2C slave devices. In an example, the controller 122 can configure the slave ports 140 to operate under the partitioned mode in response to at least one of the plurality of slave devices 150 not satisfying a specific criteria. For example, in response to the slave devices 150f, 150g, and 150h operating at a lower speed when compared to the rest of the slave devices, the controller 122 can disconnect the slave ports 140f, 140g, and 140h from the network element 110 and from their circuit blocks 130f, 130g and 130h. Upon the disconnection, the slave devices 150a to 150e can remain connected to the network element 110 and operate under transparent mode. In another example, the controller 122 can determine that the slave devices 150a to 150e are assigned to a target address space, and the slave devices 150f, 150g, and 150h are assigned to a non-target address space. The controller 122 can disconnect the slave ports 140f, 140g, and 140h from the network element 110 and from their circuit blocks 130f, 130g and 130h such that the selected master device 102a can access the slave devices 150a to 150e.

Figure 5:
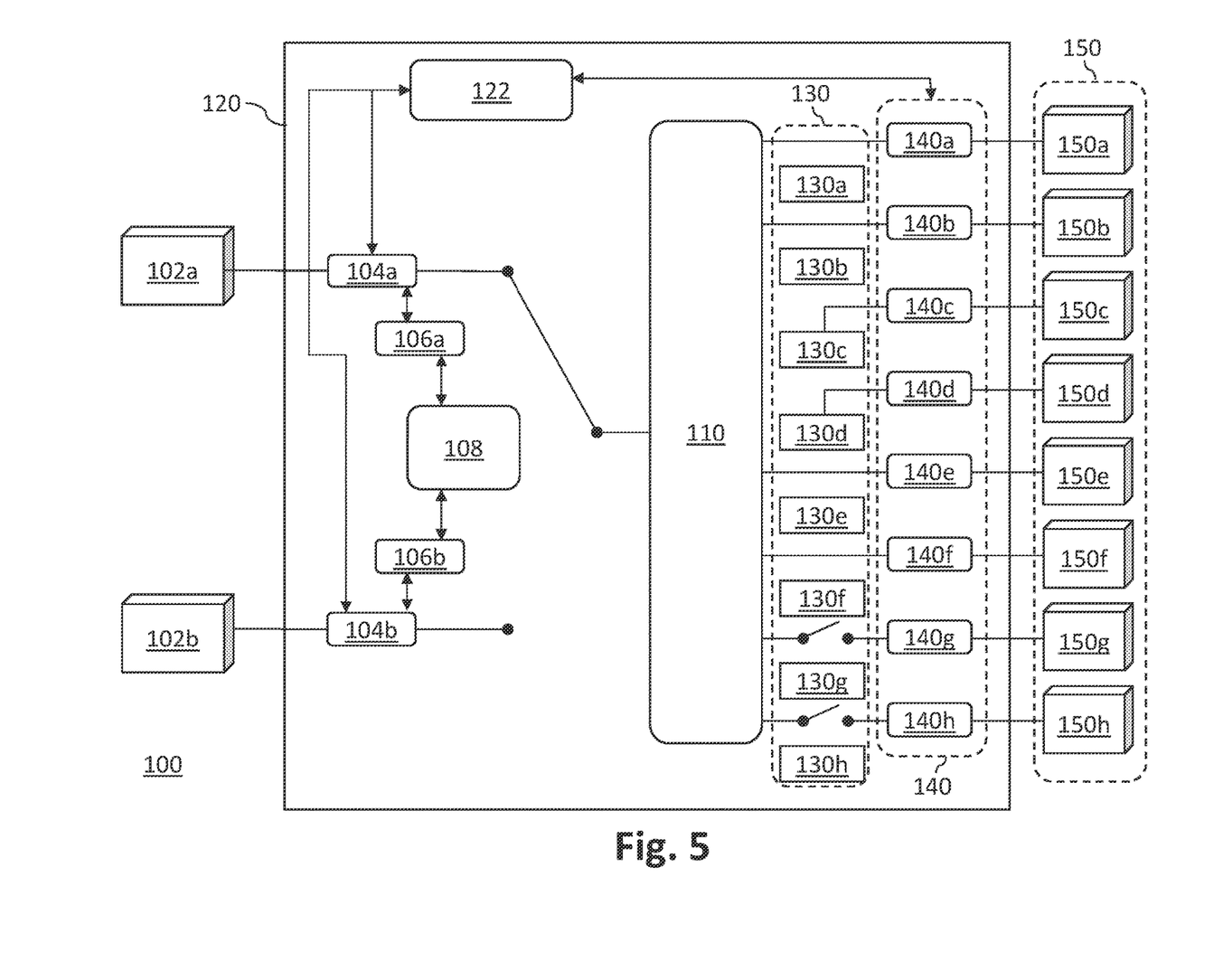
FIG. 5 is a diagram showing a combination of operation modes of the system 100 shown in FIG. 1 in one embodiment.

FIG. 5 is a diagram showing a combination of operation modes of the system 100 shown in FIG. 1 in one embodiment. In the example shown in FIG. 5, the controller 122 can control the plurality of slave ports 140 individually such that a first portion of the slave ports 140 can operate under the transparent mode, a second portion of the slave ports 140 can operate under the non-transparent mode, and a third portion of the slave ports 140 can be disconnected based on the partitioned mode. In the example shown in FIG. 5, the slave ports 140a, 140b, 140e, and 140f can be operating under the transparent mode, where the slave devices 150a, 150b, 150e, and 150f can be I3C devices or I3C compatible I2C devices. The slave ports 140c and 140d can be operating under the non-transparent mode, where the devices 150c and 150d can be I2C devices or I3C compatible I2C devices. The slave ports 140g and 140h can be disconnected from the network element 110 and the circuit blocks 130g and 130h under the partitioned mode.

The selective connection, disconnection, and operation modes for the slave ports 140 can provide flexibility by allowing the system 100 to be implemented with different types of slave devices. In an example, this flexibility can reduce a need to replace particular components of a circuit board or motherboard in entirety. For example, the slave ports of the device 120 can be configured individually to accommodate different types of slave devices (e.g., devices with different operating speeds and different communication protocols) without a need to replace old network hubs, or install new or additional network hubs, to accommodate these different slave devices.

Figure 6A:
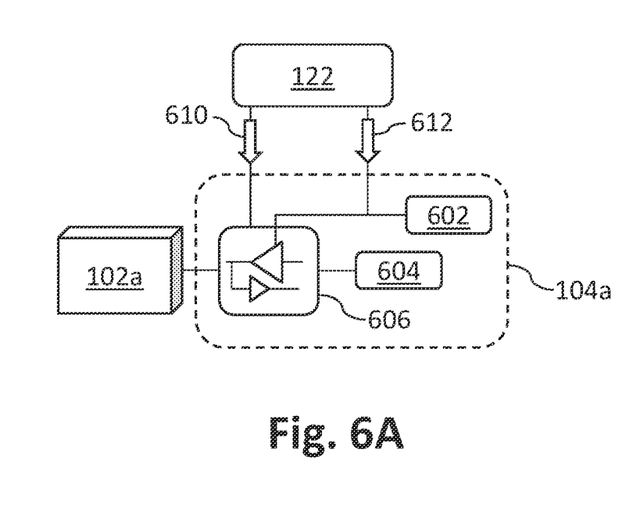
FIG. 6A is a diagram showing details of a master port relating to network device configuration based on slave device type in one embodiment.

FIG. 6A is a diagram showing details of a master port relating to network device configuration based on slave device type in one embodiment. Note that the descriptions below, pertaining to the master port 104a, in accordance with FIG. 6A can also apply to the master port 104b shown in FIG. 1 to FIG. 5. In an example shown in FIG. 6A, the master port 104a can include a low-dropout (LDO) regulator 602, a circuit 604, and a redriver circuit 606. The LDO regulator 602 can be an on-chip voltage regulator embedded on the device 120, and can be configured to supply input/output (IO) voltage to the master port 104a. The circuit 604 can be a bridging circuit that connects the master port 104a with the network element 110, and can handle open drain (OD) and push-pull operations that may be used by the master port 104a. The redriver circuit 606 can be activated to perform serial clock line (SCL) stretching (e.g., slowing down communication by holding down SCL line) if the master port 104a is operating under an open drain (OD) mode. The controller 122 can be configured to generate a control signal 610 to control the master port 104a. In an example embodiment, the control signal 610 can be a binary signal or a logic signal, such that the control signal 610 can activate (e.g., set) or deactivate (e.g., clear) an open drain (OD) only mode. Under the OD only mode, the master port 104a can be configured to perform open drain operations, such as $I^2C$ transactions, up to a specific voltage (e.g., 3.3 volts).

Under a non-OD only mode (e.g., when OD only mode is deactivated), the master port 104a can be configured to perform I3C transactions or operations, or common command code (CCC) transactions, or master transactions targeting to I3C slave devices or I3C compatible I2C slave devices (among slave devices 150). The non-OD only mode also allows the master port 104a to operate using push-pull mode subject to a voltage threshold. In some examples, the voltage threshold can be set by the LDO regulator 602 under the non-OD only mode. In an example, the controller 122 can generate a control signal 612 to connect or disconnect the master port 104a to the LDO regulator 602. In an example, when the LDO regulator 602 is connected to the master port 104a, the LDO regulator 602 can provide a regulated voltage, such as 1.0, 1.1, 1.2, or 1.8 volts (V), to the master port 104a. The master port 104a can perform the push-pull operations up to the regulated voltage provided by the LDO regulator 602. In an example, a user of the system 100 can program the operating voltage of master ports 104a and 104b (e.g., setting the regulated voltage supplied by the LDO regulator 602).

The master port 104a can have dedicated registers mapped to the register space in the storage element 108. Some of these dedicated registers can store information pertaining to a status of the master port 104a. For example, a register can store a OD_Only value to indicate whether the master port 104a is currently operating in OD only mode or non-OD only mode. The OD_Only register can store a set value (e.g., binary '1') if the master port 104a is operating in OD only mode, and store a clear value (e.g., binary '0') if the master port 104a is operating in non-OD only mode. In an example, the master port 104a can clear the OD_Only register automatically (change from '1' to '0') in response to a detection of a I3C transaction or a CCC command. Further, the value in the OD_Only register can be set or clear in response to a type of access to the register space in the storage element 108. For example, in response to a I2C access to the register space in the storage element 108, the controller 122 can control the master port 104a to clear the OD_Only register such that the master port 104a can operate under OD only mode that supports the I²C protocol. Another register can store a "VIO_M" value to indicate the regulated voltage being supplied to the master port 104a by the LDO regulator 602.

In an example, the controller 122 can receive a request for a data transaction with a 7Eh address (e.g., broadcast address in a CCC frame under the I3C protocol) and determine that the data transaction can be a I3C capable transaction. If the interface operation voltage (e.g., the regulated voltage from the LDO regulator 602) is not yet set, the interface operation voltage can be set to the I3C operation voltage associated with that master pot 104a (e.g., the value stored in the VIO_M register). Note that the VIO_M register for the master port 104a can have a different value from a VIO_M register for the master port 104b.

In an example implementation, the master port 104a can be powered up with 3.3V tolerant I2C operation. After power up, the master device 102a connected to the master port 104a can program the VIO_M register of the master port 104a to set the operation voltage to 1.2V. Then subsequent operation will be performed in accordance with this set operating voltage. For example, when the master port 104a works in the push-pull mode, 1.2V will be the push-pull IO voltage.

In another example implementation, the master port 104b can be powered up with 3.3V tolerant I2C operation. The master port 104b can have a default push-pull voltage of 1.0V. After power up, the master device 102b connected to the master port 104b can operate at 1.0V signaling level. The master device 102b can immediately start to send CCC to the controller 122 of the device 120. Upon receiving a 7Eh address in CCC frame, the controller 122 can respond to the CCC immediately and change the operating voltage to 1.0V. Any push-pull operation (e.g. in a CCC read) can operate at this pre-configured voltage of 1.0V, unless explicitly programmed otherwise.

Figure 6B:
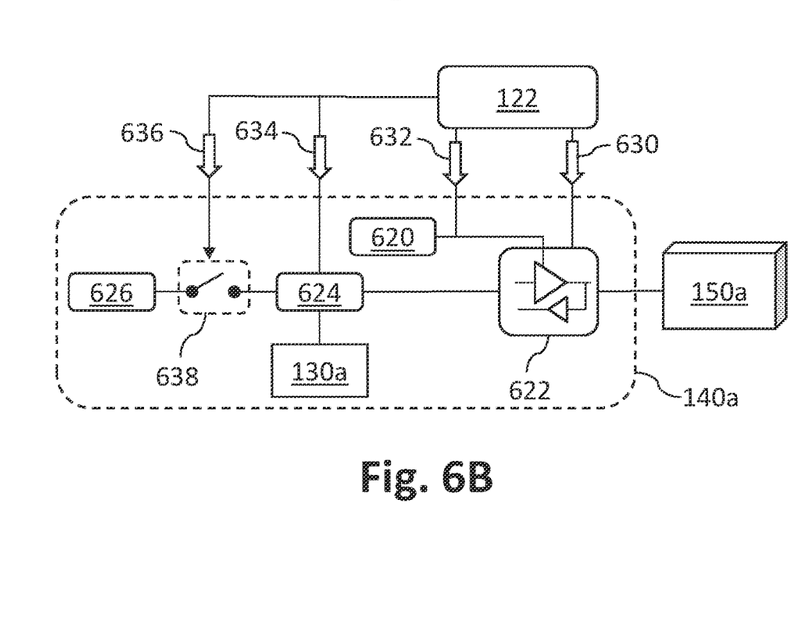
FIG. 6B is a diagram showing details of a slave port relating to network device configuration based on slave device type in one embodiment.

FIG. 6B is a diagram showing details of a slave port relating to network device configuration based on slave device type in one embodiment. Note that the descriptions below, pertaining to the slave port 140a, in accordance with FIG. 6B can also apply to the other slave ports among the plurality of slave ports 140 shown in FIG. 1 to FIG. 5. In an example shown in FIG. 6B, the slave port 140a can include a low-dropout (LDO) regulator 620, a circuit 624, a circuit 626, and a redriver circuit 622. The LDO regulator 620 can be an on-chip voltage regulator embedded on the device 120, and can be configured to supply IO voltage for the slave port 140a. The circuit 624 can be a bridging circuit within the slave port 140a, and can support open drain and push-pull operations. The circuit 626 can be a bridging circuit that connects the slave port 140a with the network element 110, and can support open drain and push-pull operations.

The slave port 140a can further include a switch 638, where the switch 638 can connect the network element 110 to the slave device 150a when the switch 638 is closed. The redriver circuit 622 can be activated to perform serial clock line (SCL) stretching if the slave port 140a is operating under an open drain (OD) mode. The controller 122 can be configured to generate a control signal 630, a control signal 634, and a control signal 636, to control the slave port 140a. In an example embodiment, the control signals 630, 634, and 636 can be binary signals or logic signals that can switch one or more switching elements on or off, or can activate (e.g., set) or deactivate (e.g., clear) one or more components in the slave port 140a. For example, the control signal 630 can activate or deactivate an OD only mode for the slave port 140a. Under the OD only mode, the slave port 140a can be configured to perform open drain operations, such as I2C transactions, up to a specific voltage (e.g., 3.3 V). Further, note that under the transparent mode, the master devices 102a and 102b and the slave devices 150 can be operating under the same open drain (OD only or non-OD only) mode. Under the non-transparent mode, the master devices 102a and 102b and the slave devices 150 may not be required to operate under same open drain mode.

Under a non-OD only mode (e.g., when OD only mode is deactivated), the slave port 140a can be configured to support I3C transactions, or CCC transactions, or transactions from the selected master port targeting to I3C slave devices or I3C compatible I2C slave devices (among slave devices 150). The non-OD only mode also allows the slave port 140a to operate using push-pull mode, where the voltage being applied to the slave port 140a can be regulated by the LDO regulator 620 under the non-OD only mode. In an example, the controller 122 can generate a control signal 632 to connect or disconnect the slave port 140a to the LDO regulator 620. In an example, when the LDO regulator 620 is connected to the slave port 140a, the LDO regulator 620 can provide a regulated voltage, such as voltage within a range of 1.0V to 1.2V, to the slave port 140a. The slave port 140a can perform the push-pull operations up to the regulated voltage provided by the LDO regulator 620. In an example, a user of the system 100 can program the operating voltage of slave ports 140 (e.g., setting the regulated voltage supplied by the LDO regulator 620).

The controller 122 can use the control signal 634 to activate or deactivate the circuit block 130a. The controller 122 can use the control signal 636 to activate or deactivate the switch 638. To activate the transparent mode of the slave port 140a, the controller 122 can generate the control signal 636 to close the switch 638 and generate the control signal 634 to disconnect the circuit block 130a from the circuit 624. In the transparent mode, the selected master device can access the slave port 140a via the circuit 626, the closed switch 638, the circuit 624, and the redriver circuit 622. To activate the non-transparent mode of the slave port 140a, the controller 122 can generate the control signal 636 to open the switch 638 and generate the control signal 634 to connect the circuit block 130a to the circuit 624. In the non-transparent mode, the circuit block 130a can access the slave port 140a via the circuit 624 and the redriver circuit 622. In an example, the activated circuit block 130a can support SCL stretching.

The storage element 108 can include registered storing values for various control signals for the slave ports 140. For example, a register can store an "OD_Only" value to indicate whether the slave port 140a is currently operating in OD only mode or non-OD only mode. The OD_Only register can store a set value (e.g., binary '1') if the slave port 140a is operating in OD only mode, and store a clear value (e.g., binary '0') if the slave port 140a is operating in non-OD only mode. In an example, the controller 122 can clear the OD_Only register (change from '1' to 'O') in response to a detection of a specific voltage or procedures (e.g., detection of an I3C transaction). Another register for the slave ports can store a "UseAgent" value to indicate whether the circuit block 130a is activated or deactivated. A set value in the UseAgent register can indicate that the circuit block 130a is activated and the slave port is in non-transparent mode, and a clear value in the UseAgent register can indicate that the circuit block 130 is deactivated and the slave port is in transparent mode. Another register for the slave port can store a "Disconnect" value to indicate whether the switch 638 is connected (closed) or disconnected (open). A set value in the Disconnect register can indicate that the switch 638 is opened, and a clear value in the Disconnect register can indicate that the switch 638 is closed.

Figure 7:
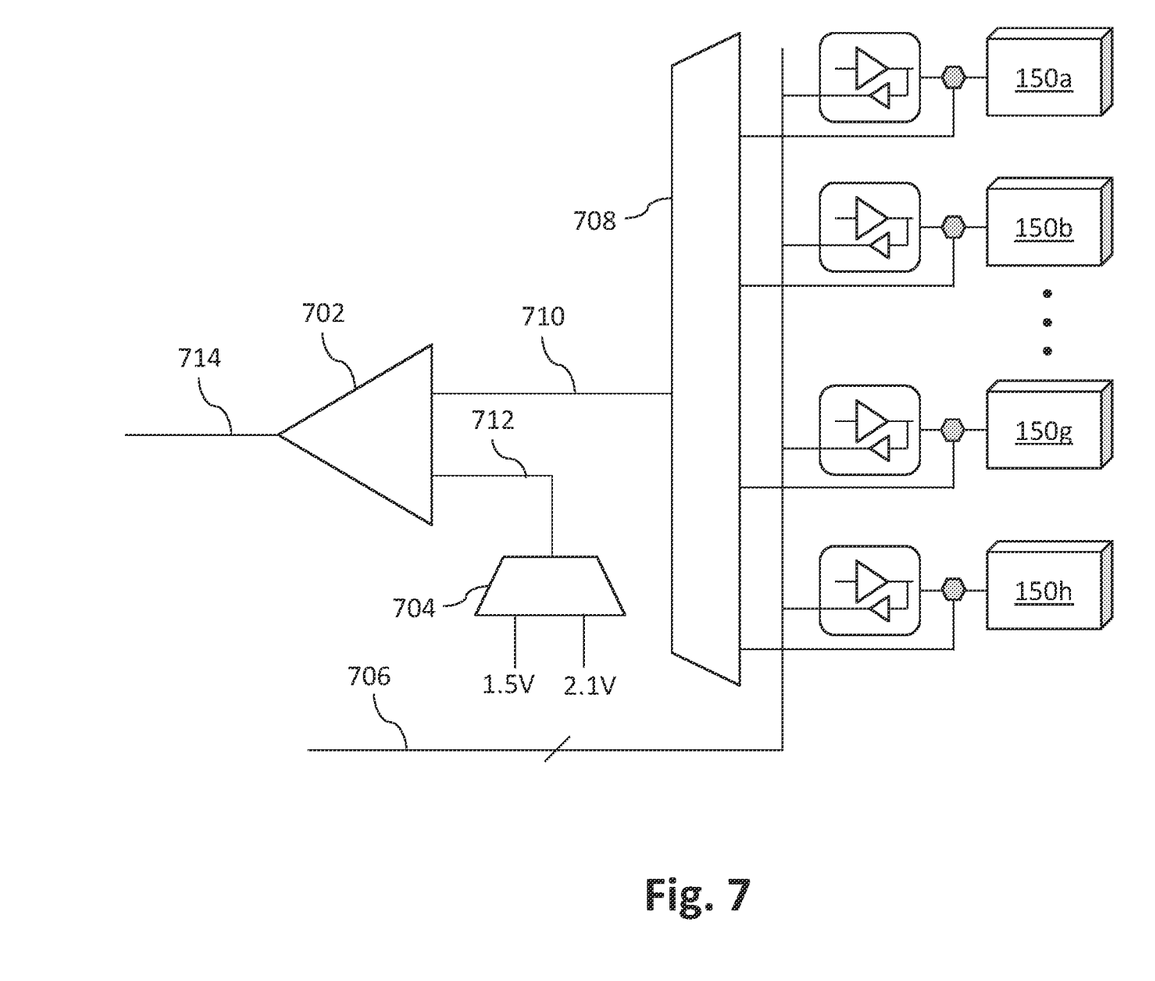
FIG. 7 is a diagram showing an example voltage detection relating to network device configuration based on slave device type in one embodiment.

FIG. 7 is a diagram showing an example voltage detection relating to network device configuration based on slave device type in one embodiment. The device 120 can include a comparator 702 configured to determine a SDA voltage of one or more slave devices. In an example, a multiplexer 708 can sequentially select the slave devices 150, where a SDA voltage 710 of a selected slave device can be inputted to the comparator 702. A threshold voltage of, for example, either 1.5V or 2.1V can be set by a user of the system 100 or the controller 122. A multiplexer 704 can output the selected voltage 712 to the comparator 702. The comparator 702 can compare the SDA voltage 710 and the selected voltage 712 to determine whether the SDA voltage is higher than or lower than the selected voltage 712. A result 714 of the comparator 702 can be used for initializing the master ports 104a and 104b, and the slave ports 140. For example, the selected voltage 712 can be 2.1V, and result 714 of the comparator 702 can indicate that a SDA voltage 710 of one of the slave devices 150 is greater than the selected voltage of 2.1V.

The comparator 702 can output the result 714 to the controller 122, and the controller 122 can enable (e.g., control signals 612 and 632 shown in FIG. 6) the LDO regulators (e.g., LDO regulator 602 and 620 shown in FIG. 6) to regulate the voltages of the master ports 104a and 104b, and the slave ports 140. In an example, the slave devices 150 can send an IBI request via an IBI trace 706 to notify the selected master device of a new state or event. The I3C Slave can generate the IBI in response to particular IBI generation events, such as detection of port state changes, or detection of errors, or other types of IBI events, etc. In some examples, the voltage detection performed by the comparator 702 can detect whether a slave port is disconnected (e.g., when the SDA voltage 710 is abnormal, such as having a zero value).

Figure 8A:
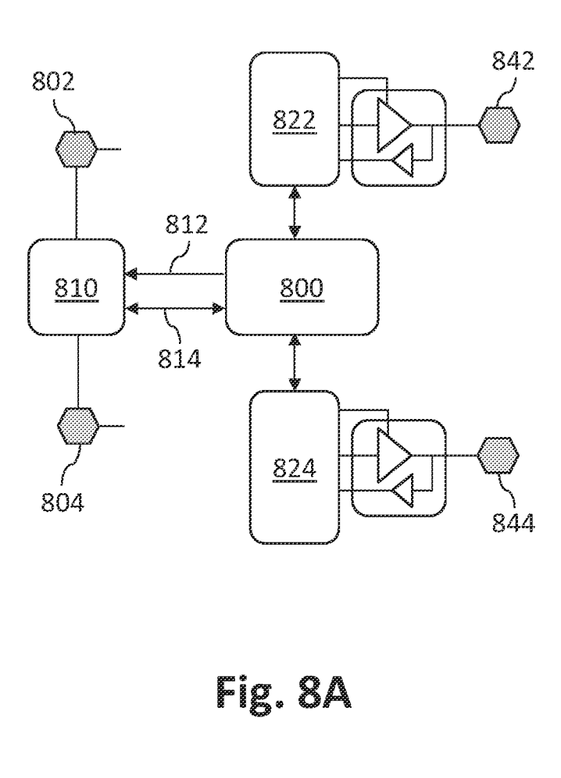
FIG. 8A is a diagram showing details of a circuit block that can be implemented in a non-transparent mode in one embodiment.
Figure 8B:
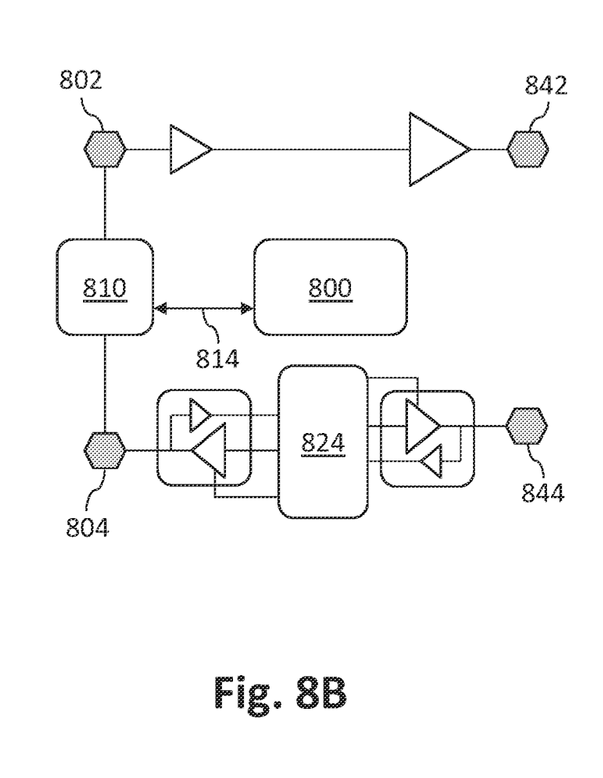
FIG. 8B is a diagram showing details of a circuit block that can be implemented in a transparent mode in one embodiment.

FIG. 8A and FIG. 8B are diagrams showing details of a circuit block that can be implemented in a non-transparent mode in one embodiment. FIG. 8A illustrates an example configuration where a SMBus agent 800 (e.g., a circuit block among the circuit blocks 130) is active or activated (e.g., a corresponding slave port is in non-transparent mode). FIG. 8B illustrates an example configuration where the SMBus agent 800 is inactive or deactivated (e.g., a corresponding slave port is in transparent mode or is disconnected). The SMBus agent 800 can be a circuit block among the circuit blocks 130 that can be configured to operate as a slave-side master and can be configured to support slave transactions. The SMBus agent 800 can include a master agent or circuit block configured to initiate write, read, write-follow by-read transactions. The SMBus agent 800 can further include a slave agent or circuit block configured to receive transactions from a slave port (e.g., a slave port among the slave ports 140). The SMBus agent 800 can further include one or more transaction buffers configured to store transaction data and descriptors.

A slave port attached to the SMBus agent 800 ("the attached slave port") can include a bridging circuit 822 and a bridging circuit 824. The bridging circuits 822 and 824 can include logic component that can facilitate OD and/or push-pull modes for a slave device connected to the attached slave port. In FIG. 8A, when the SMBus agent 800 is active (e.g., when the attached slave port is in non-transparent mode), a SCL channel 842 connected to the attached slave port is connected to the bridging circuit 822, and a SDA channel 844 connected to the attached slave port is connected to the bridging circuit 824. Further, in the non-transparent mode, a SCL channel 802 and a SDA channel 804 connected to the selected master port can be disconnected from the bridging circuits 822 and 824, respectively. Thus, the selected master device may not interact with the slave device connected to the attached slave port, and the SMBus agent 800 can facilitate the interactions. In an example, the SCL channel 842 can be a push-pull output driver that operates at the VIO logic level (e.g., the regulated voltages from LDO regulators shown in FIG. 6A and FIG. 6B). Further, the SCL channel 842 can operate in push-pull operation regardless of whether the attached slave port is in in I2C mode or I3C mode. If IBI is enabled, an IBI with status register as the payload will be generated to the selected master device via a IBI trace 812. A data access line can also be present between the SMBus agent 800 and the master side on-chip slave interface 810, regardless of whether the SMBus agent 800 is active or inactive.

The master agent in the SMBus agent 800 can, for example, initiate SMBus or I2C transactions, and can support SCL stretching. The SMBus agent 800 can also support slave side SCL stretching. The master agent and the slave agent in the SMBus agent 800 can operate in parallel. In an example, the slave agent can access two transaction buffers, such that it can receive a new slave transaction immediately after the first slave transaction is received, and the buffered data is not yet retrieved by the master side. If bother buffers are full, the slave agent will output a negative acknowledgement in subsequent transactions. The SMBus agent 800 can further include dedicated data buffers that can be accessed via the paged buffer space of the storage element 108. The SMBus agent 800 can receive a transaction descriptor from a master side on-chip slave interface 810 (e.g., on-chip slave interface 106a and 106b) initiate a SMBus master transaction at the attached slave port.

Figure 9:
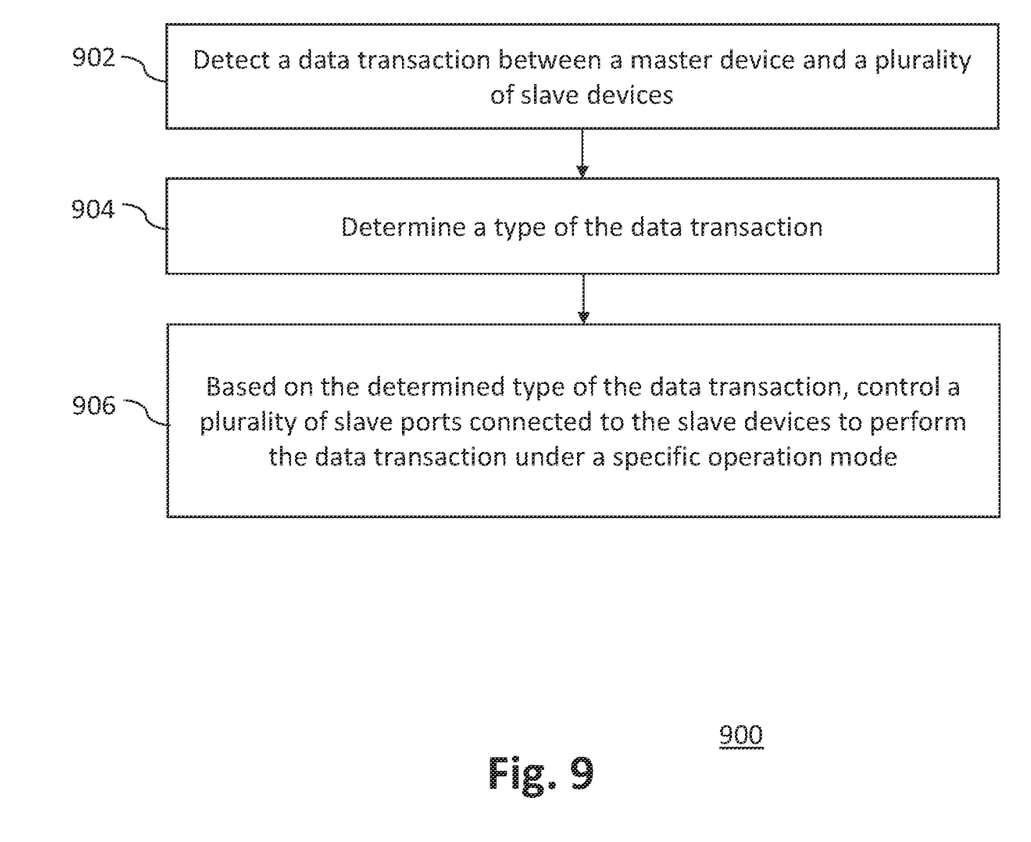
FIG. 9 is a flow diagram illustrating a process of implementing network device configuration based on slave device type in one embodiment.

In FIG. 8B, when the SMBus agent 800 is inactive (e.g., when the attached slave port is in transparent mode), the SCL channel 802 on the master side can be connected to the SCL channel 842 on the slave side, and the SDA channel 804 on the master side can be connected to the SDA channel 844 on the slave side via the bridging circuit 824. Further, in the transparent mode, the SMBus agent 800 can be disconnected from the bridging circuit 824, and IBI is disabled. Thus, the selected master device can interact with the slave device connected to the attached slave port. In an example, FIG. 9 is a flow diagram illustrating a process 900 of implementing network device configuration based on slave device types in one embodiment. The process 900 can include one or more operations, actions, or functions as illustrated by one or more of blocks 902, 904, and/or 906. Although illustrated as discrete blocks, various blocks can be divided into additional blocks, combined into fewer blocks, eliminated, or performed in parallel, depending on the desired implementation.

The process 900 can begin at block 902. At block 90s, a network device can detect a data transaction between a master device and a plurality of slave devices. The process 900 can proceed from block 902 to block 904. At block 904, the network device can determine a type of the data transaction. The process 900 can proceed from block 904 to block 906. At block 906, the network device can, based on the determined type of the data transaction, control a plurality of slave ports connected to the slave devices to perform the data transaction under a specific operation mode among a first operation mode, a second operation mode, and a third operation mode. The first operation mode can cause the master device to perform the data transaction with the plurality of slave devices via a network element, and the plurality of slave devices are connected to one another via the network element. The second operation mode can disconnect the master device from the plurality of slave ports, and can cause a plurality of circuit blocks connected to the plurality of slave ports to perform the data transaction with the plurality of slave devices. The third operation mode can cause the master device to perform the data transaction with a first subset of the plurality of slave devices via the network element, and can cause the master device to be disconnected from a second subset of the plurality of slave devices.

In some examples, the network device can activate the first operation mode for the plurality of slave ports in response to the type of the data transaction being an I3C transaction. In some examples, the network device can activate the second operation mode for the plurality of slave ports in response to the type of the data transaction being an I2C transaction. In some examples, the network device can activate the third operation mode for the plurality of slave ports in response to the first subset of the plurality of slave devices being capable of performing the determined type of the data transaction, and in response to the second subset of the plurality of slave devices being incapable of performing the determined type of the data transaction.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a master port channel:
a first slave channel;
a second slave channel;
a first bridging circuit;
a second bridging circuit; and
a bus agent configured to operate as a slave master and support slave transactions, wherein:
in response to the bus agent being activated:
the first slave channel and the second slave channel are connected to the first bridging circuit and the second bridging circuit, respectively;
the bus agent is connected to the first bridging circuit and the second bridging circuit; and
the master port channel is disconnected from the first and second bridging circuit; and
in response to the bus agent being deactivated, the master port channel is connected to one of the first slave channel and the second slave channel via the second bridging circuit.

2. The apparatus of claim 1, wherein:
in response to the bus agent being activated, the bus agent is configured to fulfill the slave transactions with a slave device connected to the first slave channel and the second slave channel; and
in response to the bus agent being deactivated, a master device connected to the master port channel is configured to fulfill the slave transactions with the slave device via a network element.

3. The apparatus of claim 1, wherein the bus agent comprises at least one transaction buffer configured to store transaction data and descriptors.

4. The apparatus of claim 1, wherein the first slave channel is a serial clock line (SCL) channel and the second slave channel is a serial data (SDA) line channel.

5. The apparatus of claim 1, wherein:
a slave device is connected to the first slave channel and the second slave channel;
the bus agent is activated in response to the slave device being an inter-integrated circuit (I2C) device; and
the bus agent is deactivated in response to the slave device being an I3C device.

6. The apparatus of claim 1, wherein the first slave channel is a push-pull output driver that operates at a regulated voltage.

7. The apparatus of claim 1, wherein in response to the bus agent being activated, the bus agent supports I2C stretching.

8. The apparatus of claim 1, wherein in response to the bus agent being activated, the bus agent is configured to:
generate an in-band interrupt (IBI) signal including a payload encoding a status register; and
send the IBI signal to the master port channel via an IBI trace.

9. A system comprising:
a master device;
a plurality of slave devices; and
a plurality of bus agents, each bus agent among the plurality of bus agents being configured to operate as a slave master and support slave transactions, wherein:
in response to a bus agent being activated:

the bus agent is connected to a slave device among the plurality of slave devices via a first bridging circuit and a second bridging circuit;

the bus agent is connected to the master device; and the master device is disconnected from the first bridging circuit and the second bridging circuit; and in response to the bus agent being deactivated, the master device is connected to the slave device via the second bridging circuit.

10. The system of claim 9, wherein:

in response to the bus agent being activated, the bus agent is configured to fulfill the slave transactions with the slave device; and in response to the bus agent being deactivated, the master device is configured to fulfill the slave transactions with the slave device via a network element.

11. The system of claim 9, wherein the bus agent comprises at least one transaction buffer configured to store transaction data and descriptors.

12. The system of claim 9, wherein in response to the bus agent being activated:

the slave device is connected to the first bridging circuit via a serial clock line (SCL) channel; and the slave device is connected to the second bridging circuit via a serial data (SDA) line channel.

13. The system of claim 9, wherein:

the bus agent is activated in response to the slave device being an inter-integrated circuit (I2C) device; and the bus agent is deactivated in response to the slave device being an I3C device.

14. The system of claim 9, wherein in response to the bus agent being activated, the bus agent supports I2C stretching.

15. The system of claim 9, wherein in response to the bus agent being activated, the bus agent is configured to:

generate an in-band interrupt (IBI) signal including a payload encoding a status register; and send the IBI signal to the master device via an IBI trace.

16. A method for controlling data transaction between a master device and a slave device, the method comprising:

detecting a data transaction between a master device and a slave device;

determining a type of the data transaction;

in response to the type of data transaction being a first type of data transaction:

connecting a bus agent to a first bridging circuit, wherein the bus agent is configured to operate as a slave master and support slave transactions with the slave device;

connecting the slave device to the first bridging circuit;

connecting the bus agent to a second bridging circuit;

connecting the slave device to the second bridging circuit; and disconnecting the master device from the first bridging circuit and the second bridging circuit; and in response to the type of data transaction being a second type of data transaction, connecting the master device to the second bridging circuit.

17. The method of claim 16, further comprising:

in response to the bus agent being activated, the bus agent is configured to fulfill the slave transactions with the slave device; and in response to the bus agent being deactivated, the master device is configured to fulfill the slave transactions with the slave device via a network element.

18. The method of claim 16, wherein:

connecting the slave device to the first bridging circuit comprises connecting the slave device to the first bridging circuit via a serial clock line (SCL) channel; and connecting the slave device to the second bridging circuit comprises connecting the slave device to the second bridging circuit via a serial data (SDA) line channel.

19. The method of claim 16, wherein:

the first type of data transaction is an inter-integrated circuit (I2C) transaction; and the second type of data transaction an I3C transaction.

20. The method of claim 16, wherein in response to the type of data transaction being the first type of data transaction, generating an in-band interrupt (IBI) signal including a payload encoding a status register; and sending the IBI signal to the master device via an IBI trace.

* * * * *